(12) United States Patent
Schwartz (10) Patent No.: US 11,633,014 B2
(45) Date of Patent: *Apr. 25, 2023

(54) SUPPORTIVE INSOLE

(71) Applicant: Yenta + Posha, Goochland, VA (US)

(72) Inventor: Brianna Schwartz, Goochland, VA (US)

(73) Assignee: Yenta + Posha, Goochland, VA (US)

(*) Notice: Subject to any disclaimer, the term of this patent is extended or adjusted under 35 U.S.C. 154(b) by 144 days.

This patent is subject to a terminal disclaimer.

(21) Appl. No.: 17/005,436

(22) Filed: Aug. 28, 2020

(65) Prior Publication Data

US 2020/0390193 A1 Dec. 17, 2020

Related U.S. Application Data

(63) Continuation of application No. 16/002,725, filed on Jun. 7, 2018, now Pat. No. 10,772,381.

(51) Int. Cl.
| | |
|---|---|
| A43B 17/14 | (2006.01) |
| A43B 7/24 | (2006.01) |
| A43B 17/10 | (2006.01) |
| A43B 7/14 | (2022.01) |
| A43B 7/32 | (2006.01) |
| A43B 1/00 | (2006.01) |
| A43B 7/142 | (2022.01) |
| B32B 27/40 | (2006.01) |
| B32B 3/26 | (2006.01) |

(52) U.S. Cl.
CPC ............ *A43B 17/14* (2013.01); *A43B 1/0063* (2013.01); *A43B 7/142* (2013.01); *A43B 7/24* (2013.01); *A43B 7/32* (2013.01); *A43B 17/10* (2013.01); *B32B 3/266* (2013.01); *B32B 27/40* (2013.01); *B32B 2437/02* (2013.01)

(58) Field of Classification Search
None
See application file for complete search history.

(56) References Cited

U.S. PATENT DOCUMENTS

| | | | |
|---|---|---|---|
| 1,828,086 A | 10/1931 | Tweedie | |
| 1,864,999 A | 6/1932 | Gluckman | |
| 1,973,402 A | 9/1934 | Bohmbach | |
| 1,992,081 A * | 2/1935 | Madinger | A43B 7/142 36/178 |
| 2,088,511 A * | 7/1937 | Frei | A43B 7/144 36/80 |
| 2,440,273 A * | 4/1948 | Hukill | A43B 7/1445 36/141 |
| 2,943,405 A | 7/1960 | Olson et al. | |

(Continued)

*Primary Examiner* — Jila M Mohandesi
(74) *Attorney, Agent, or Firm* — Dawn-Marie Bey; Bey & Cotropia PLLC (57) ABSTRACT

A shoe insole includes a semi-rigid shell for providing a wearer with extended comfort. The semi-rigid shell includes a notch which is located on the outward side of the wearer's foot and accommodates pronation of the foot during use. Additionally, the semi-rigid shell includes an extended side portion which is located opposite of the notch side on an inner side of the wearer's foot. The semi-rigid shell is shorter in length than the length of a shoe sole and slightly shorter in width and may be combined with an insole comfort cover to provide cushion between the wearer's foot and the semi-rigid shell.

20 Claims, 8 Drawing Sheets

(56) References Cited

U.S. PATENT DOCUMENTS

| | | | | |
|---|---|---|---|---|
| 3,828,792 | A | * | 8/1974 | Valenta .................. A43B 13/40 |
| | | | | 36/178 |
| 4,317,293 | A | * | 3/1982 | Sigle .................... A43B 7/1425 |
| | | | | 36/43 |
| 4,510,700 | A | * | 4/1985 | Brown ..................... A43B 7/22 |
| | | | | 36/154 |
| 4,686,993 | A | | 8/1987 | Grumbine |
| 4,782,605 | A | * | 11/1988 | Chapnick ............... A43B 7/144 |
| | | | | 36/154 |
| 4,783,910 | A | * | 11/1988 | Boys, II ............... A43B 7/1415 |
| | | | | 36/108 |
| 4,823,420 | A | * | 4/1989 | Bartneck ................ A43B 17/14 |
| | | | | 12/142 N |
| 4,862,604 | A | | 9/1989 | Hauser |
| 5,282,326 | A | | 2/1994 | Schroer, Jr. et al. |
| 6,173,511 | B1 | | 1/2001 | Perrault |
| 7,958,653 | B2 | | 6/2011 | Howlett et al. |
| D729,508 | S | | 5/2015 | Haasteren |
| D768,970 | S | | 10/2016 | Van Haasteren |
| 9,510,643 | B2 | | 12/2016 | Blum |
| 2004/0194344 | A1 | * | 10/2004 | Tadin ..................... A43B 7/145 |
| | | | | 36/173 |
| 2012/0272546 | A1 | | 11/2012 | Tsai |
| 2012/0304490 | A1 | | 12/2012 | Pichler |
| 2016/0066647 | A1 | | 3/2016 | Handorf |
| 2017/0368722 | A1 | | 12/2017 | Jacobsen |

* cited by examiner

SUPPORTIVE INSOLE

CROSS-REFERENCE TO RELATED APPLICATIONS

The present application is a continuation of U.S. application Ser. No. 16/002,725, filed Jun. 7, 2018, titled "Supportive Insole," which is incorporated herein by reference in its entirety.

BACKGROUND

Field of the Embodiments

The present embodiments are generally directed to a removable shoe insole which includes multiple components having individual and combined attributes for providing comfort to the wearer.

Description of the Related Art

Various insoles exist in the art today. Examples include various insoles shown and described in U.S. Design Pat. Nos. 768970 and 729508.

SUMMARY OF THE EMBODIMENTS

In a first preferred embodiment, a semi-rigid shell for a shoe insole, includes: a unitary composition of semi-rigid material having a length approximately parallel to the shoe insole that is greater than 50% of a total length of the shoe insole and less than 75% of a total length of the shoe insole and having a width approximately parallel to the shoe insole that is greater than 75% of a total width of the shoe insole and less than 100% of a total width of the shoe insole; wherein the unitary composition includes a first side that extends a predetermined amount in a direction perpendicular to the shoe insole at a first edge; and further wherein, along a second edge opposite the first edge, the unitary composition includes a notch that extends into the width and length thereof.

In a second preferred embodiment, a tri-layer shoe insole includes: a first layer formed of a semi-rigid material and having a first length and first width that are less than a shoe sole length and width, wherein the first layer includes a first side that extends a predetermined amount in a direction perpendicular to the shoe insole at a first edge; a second layer contacted to the first layer, the second layer being formed of a flexible material and having a second length and a second width that are approximately equal to the shoe sole length and width; and a third layer contacted to the second layer, the third layer being formed of a wicking material and having a third length and a third width that are approximately equal to the shoe sole length and width.

BRIEF DESCRIPTION OF THE FIGURES

The following representative figures are intended to be considered with the text below.

DETAILED DESCRIPTION

Figure 1A:
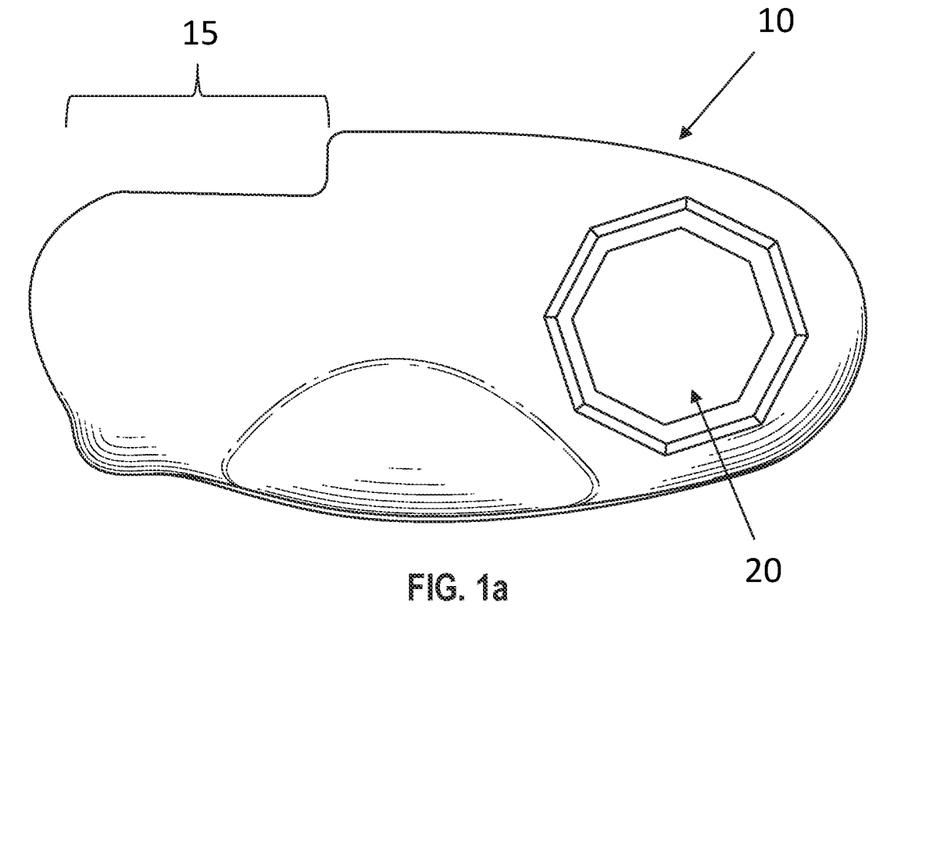
FIGS. 1a-1d provide various views of a semi-rigid shell for use as part of a tri-layer insole in accordance with one or more embodiments described herein.

The present embodiments are directed to an insole, including a novel semi-rigid shell implementing fluid gate technology, for providing a wearer with extended comfort. Referring to the Figures in turn, FIGS. 1a-1d provide various views of the semi-rigid shell 10. The semi-rigid shell 10 made in accordance with the preferred embodiments allows for balance through the natural gait cycle, thus accommodating the natural gate in a fluid fashion. At heel strike we tend to hit more lateral on our heel, pronate through full weight bearing (or stance phase) and come back out to neutral during swing phase. FIG. 1a is a top view of the semi-rigid shell 10 which faces the foot of the wearer (FIG. 1c shows bottom view which faces shoe) and includes a notch 15 which is located on the outward or lateral side of the wearer's foot. The lateral side is left open to accommodate more foot wear, pronation and maintaining the high medial flange of the arch. The ground reaction forces for the entire forefoot are more evenly distributed.

The semi-rigid shell 10 also includes a slot 20 located near the heel of the wearer for receiving therethrough a shock absorption material which is located on an insole shell cover 50 (discussed further herein below). The semi-rigid shell 10 is shorter in length than the length of a shoe sole and slightly shorter in width. Although exact dimensions vary in accordance with shoe size, in order to provide context and illustrate approximate ratios, in a preferred embodiment, e.g., insole for women's shoe size US 7/8, a width of the semi-rigid shell 10 is approximately 50 mm at the heel and up to 55-60 mm at the location of the ball of the foot. The notch 15 is approximately 10 mm in width and runs approximately 44 mm in length as measured along the side of the semi-rigid shell 10. At a longest point, a length of the semi-rigid shell 10 is approximately 155 to 160 mm.

Figure 1B:
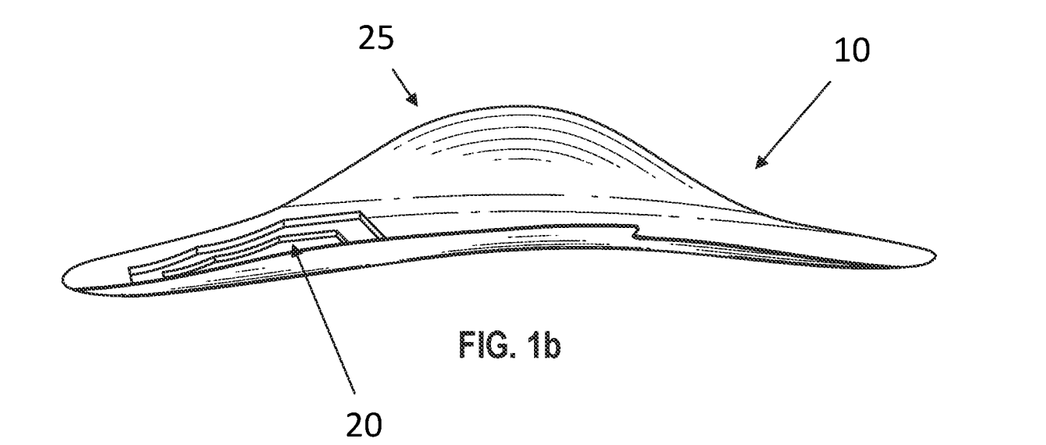
Figure 1C:
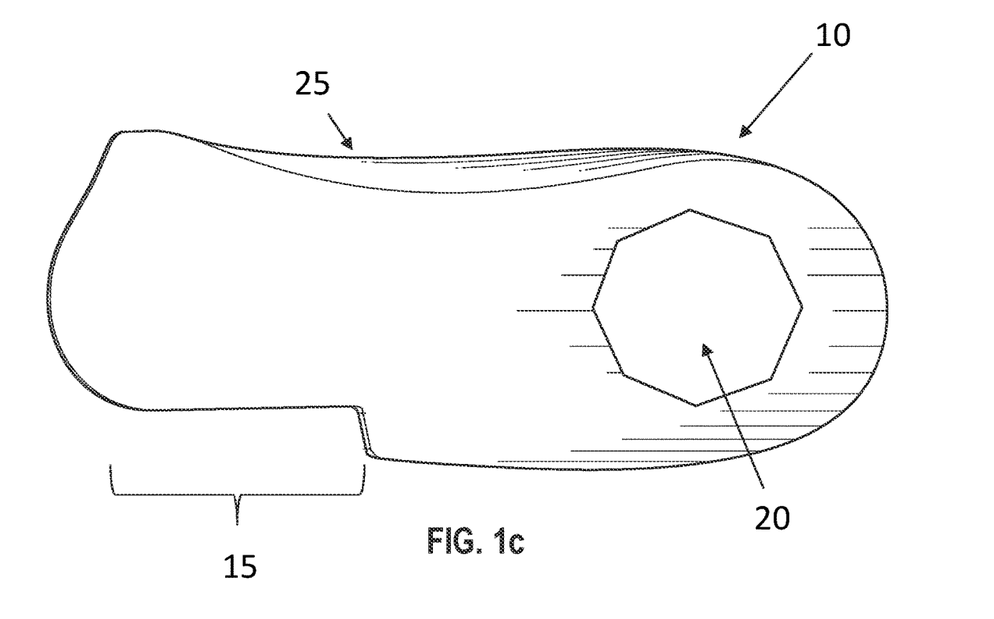
Figure 1D:
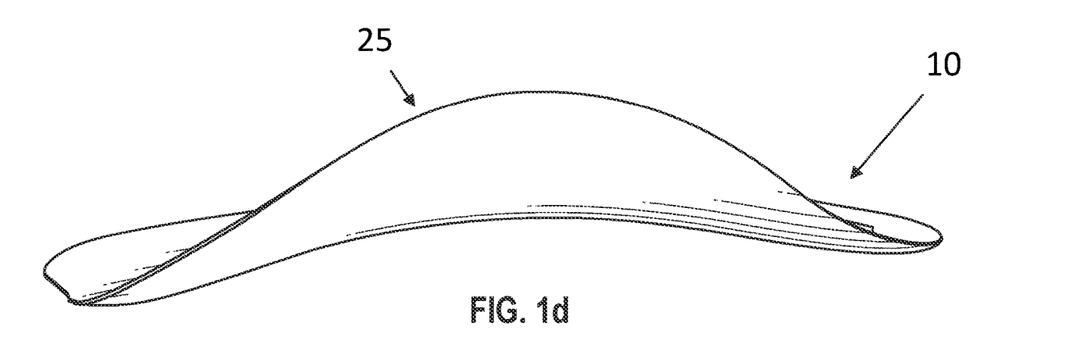

FIGS. 1b and 1d show side views of the semi-rigid shell 10, including an extended side portion 25 which is located opposite of the notch 10 side on an inner side of the wearer's foot. In a preferred embodiment, the extended side portion 25 extends up the inner side of the wearer's foot approximately 30 to 35 mm, with a preferred length of 33 mm from the bottom of the semi-rigid shell 10 at its highest, middle point, tapering in a curved fashion on either side. One skilled in the art recognizes that this height may be modified in accordance with overall shoes (foot) size in order to maintain proper dimensions of the semi-rigid shell 10 and provide the proper support and comfort for the wearer.

In a preferred embodiment, the semi-rigid shell 10 is formed from thermoplastic polyurethane (TPU) which is a mixed material including hard plastic and soft silicone, having a unique combination of properties including: elasticity, transparency, oil resistant, melt processable and recyclable. One skilled in the art recognizes that other materials, with similar properties and qualities, may also be used to form the semi-rigid shell 10.

Figure 2A:
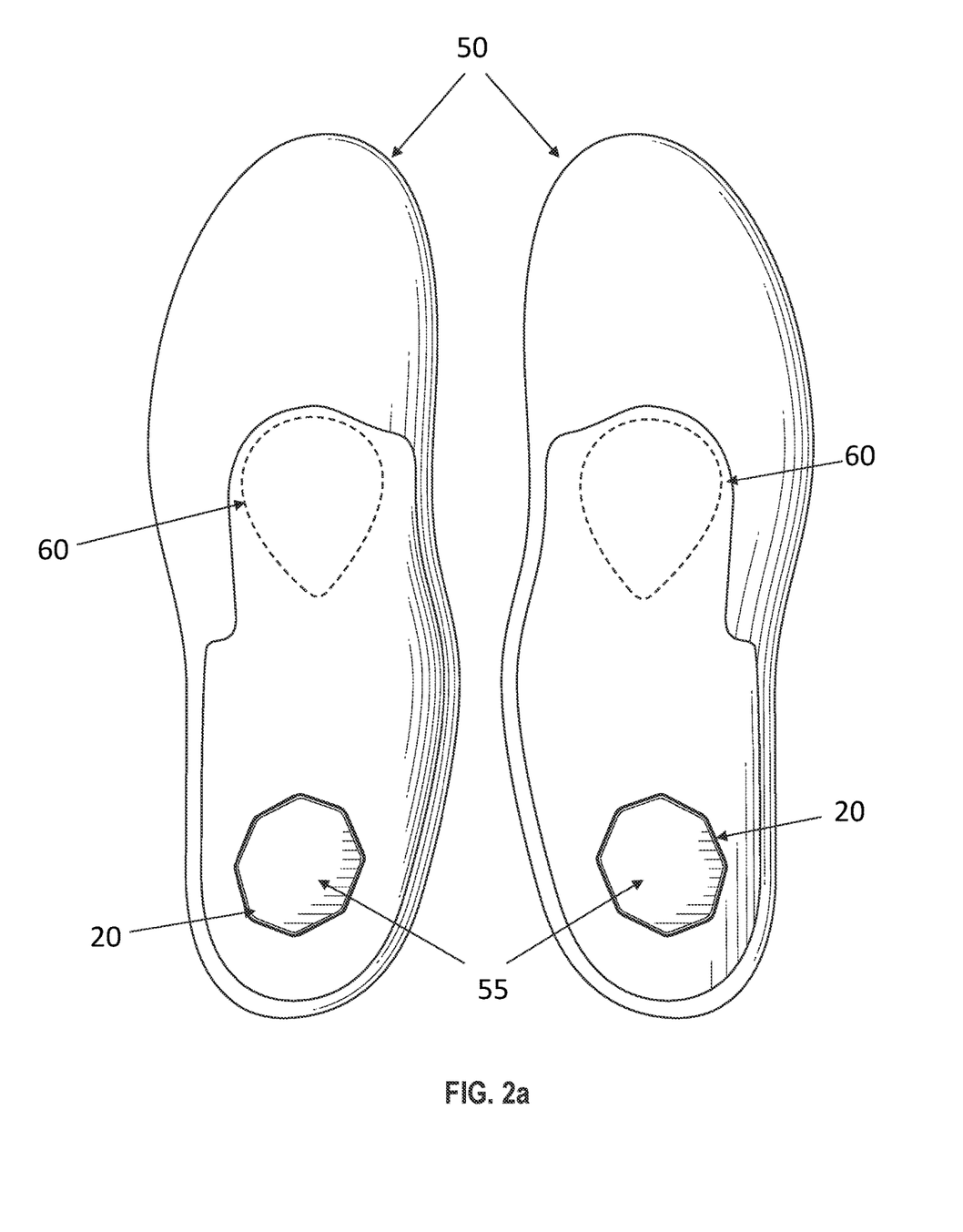
FIGS. 2a and 2b illustrate bottom and a side views of the semi-rigid shell of FIGS. 1a-1d when it is attached to an insole comfort shell cover in accordance with one or more embodiments described herein.
Figure 2B:
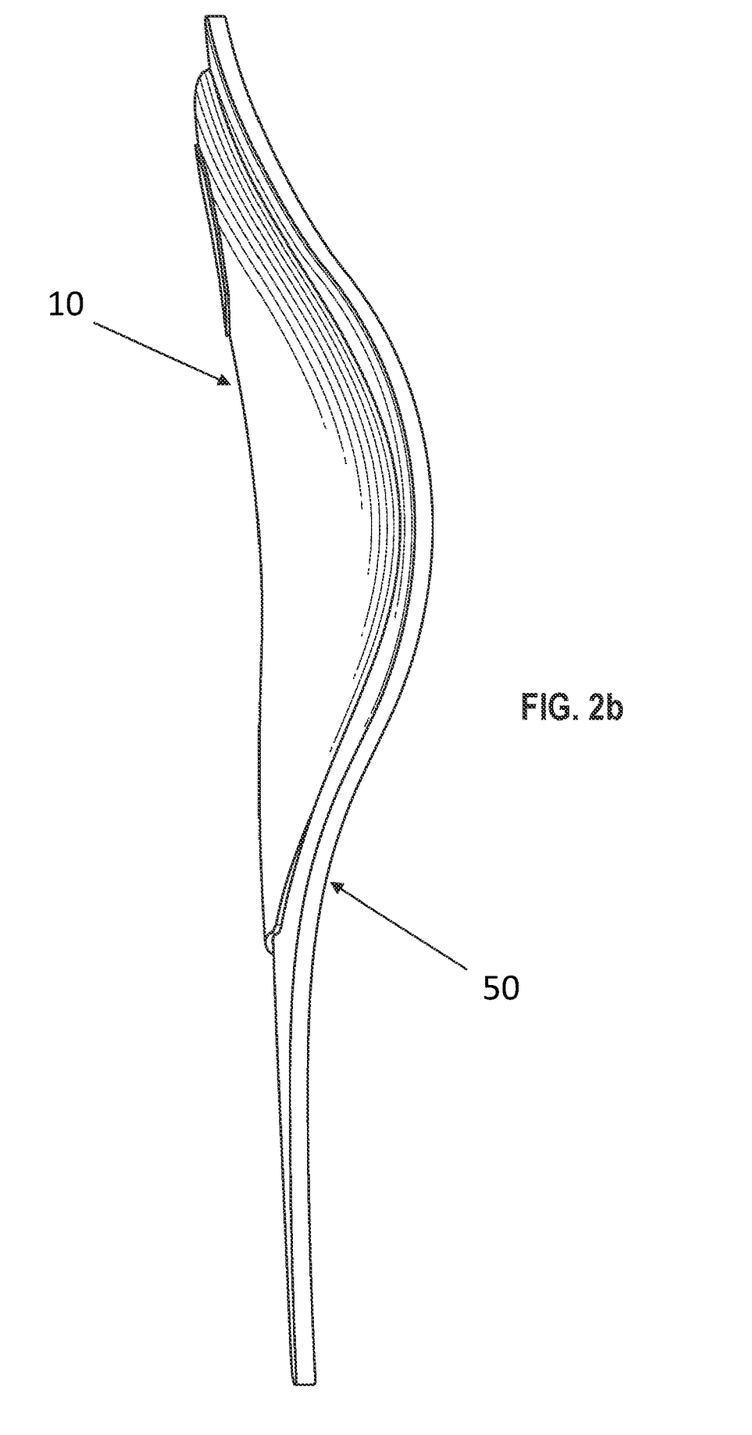

FIGS. 2a and 2b illustrate bottom and a side view of the semi-rigid shell 10 when it is attached to an insole comfort shell cover 50. The insole comfort shell cover 50 extends in length and width to the approximate size of the inside sole of a wearer's shoe, e.g., approximately 245 mm for US size 7 (with commensurate increases or decreases of 8.46 mm per whole size, e.g., 253.46 mm for US size 8, etc.) length and approximately 85 mm width at widest location. In the preferred embodiments, the insole comfort shell cover 50 is formed of an open cell breathable material such as Poron® and/or ethylene-vinyl acetate (EVA) which offers an additional level of comfort but is a closed-cell material. The insole comfort shell cover 50 includes a heel pad 55 attached thereto which is inserted through slot 20 of the semi-rigid shell 10 when the insole comfort shell cover 50 is attached to the semi-rigid shell 10, e.g., via a gluing process. The heel pads 55 are formed from thermoplastic elastomers or thermoplastic rubbers which combine the characteristics of rubber with the characteristics of plastic, e.g., recyclability and processing advantages, and improve impact strength. At the largest width, the heel pads 55 are approximately 35 mm and preferably 3 to 5 mm in thickness. The insole comfort shell cover 50 may also include a metatarsal support 60 provided thereon which is covered from view by the semi-rigid shell 10 when attached thereto. Similar to the heel pads 55, the metatarsal support 60 is preferably formed from thermoplastic elastomers or thermoplastic rubbers. The metatarsal supports 60 are approximately 1 to 2 mm in thickness and are formed in a tear drop or similar configuration, extending in length to approximately 50 mm length at the longest point and approximately 35 mm width at the largest width.

In the FIG. 2b side view, the height of the extended side portion of the semi-rigid shell 10 is shown, with the overlayed insole comfort shell cover 50 attached thereto. The heel pad 55 is just visible as it extends slightly through the slot 20 of the semi-rigid shell 10.

Figure 3:
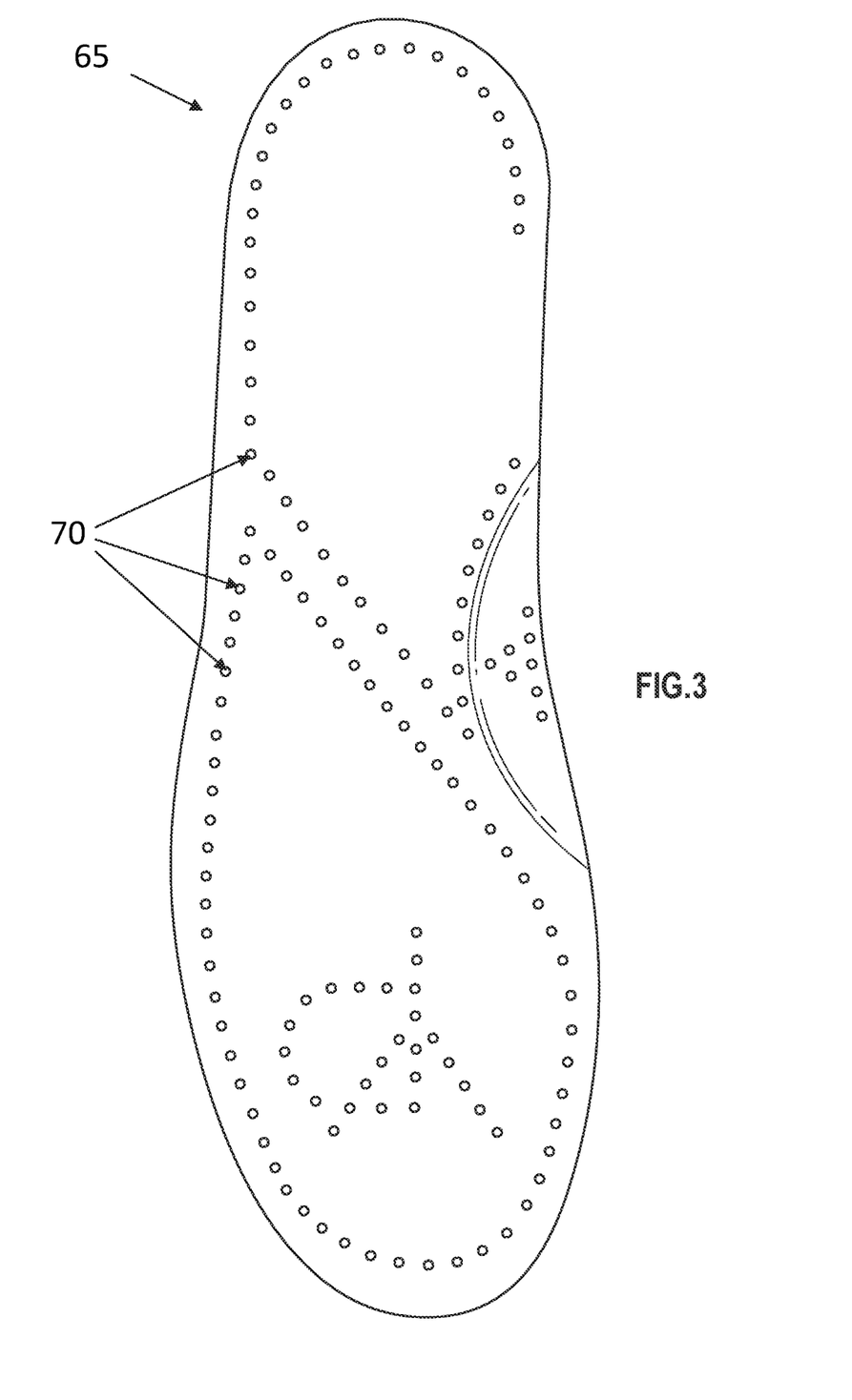
FIG. 3 shows a top side view of an insole cover in accordance with one or more embodiments described herein.

FIG. 3 shows a top side view of an insole cover 65 which may be formed of a suitable material such as bamboo charcoal fabric or leather. Holes 70 may be place in the insole cover 65 as is known in the art to provide for breathability and moisture-wicking. At a toe portion of the both the insole comfort shell cover 50 and insole cover 65, variations in the configuration of the tip, e.g., more round or more pointed, in accordance with the intended shoe.

Figure 4A:
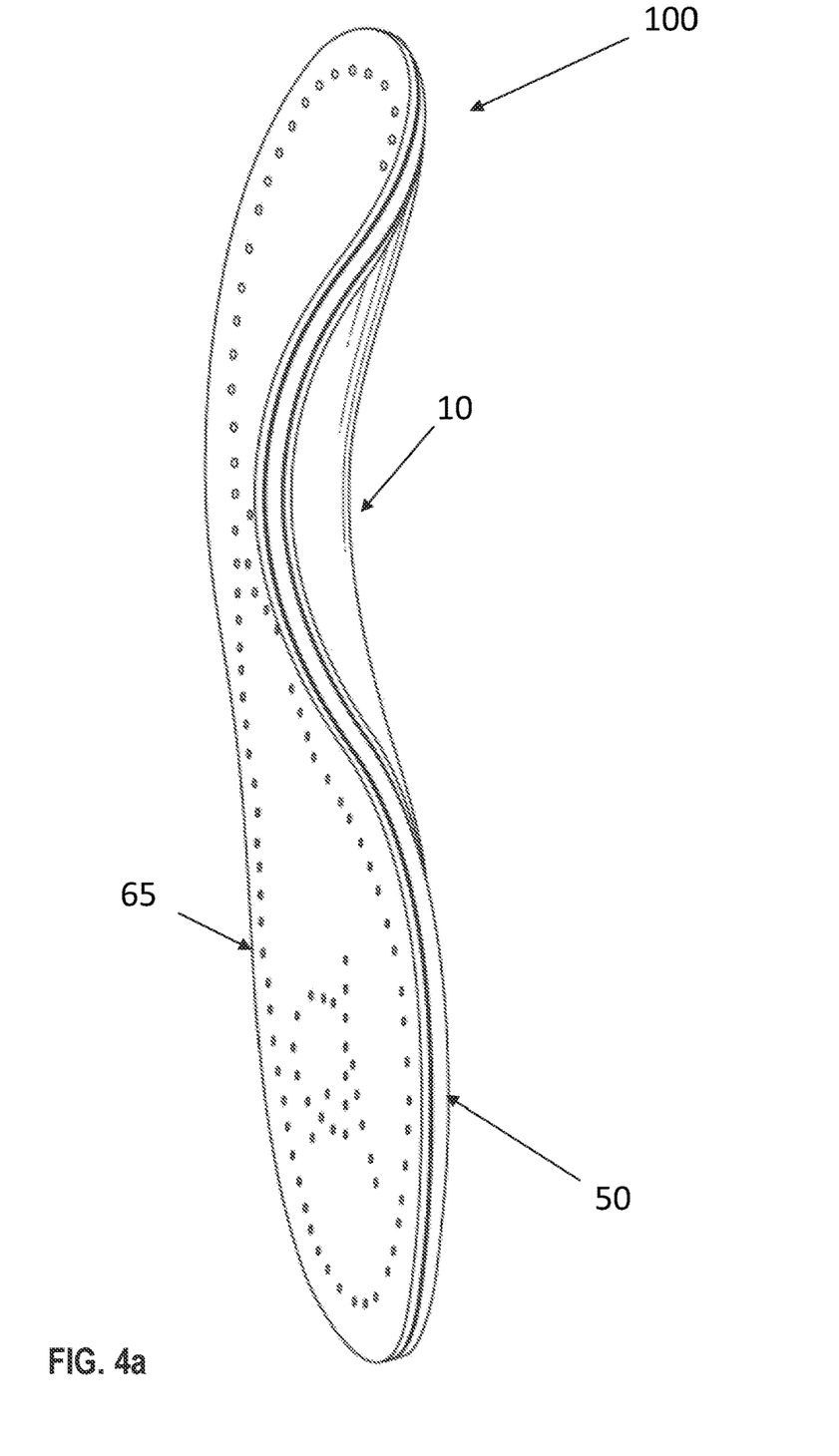
FIGS. 4a and 4b illustrate assembled (4a) and expanded (4b) views of a tri-layer insole in accordance with one or more embodiments described herein.
Figure 4B:
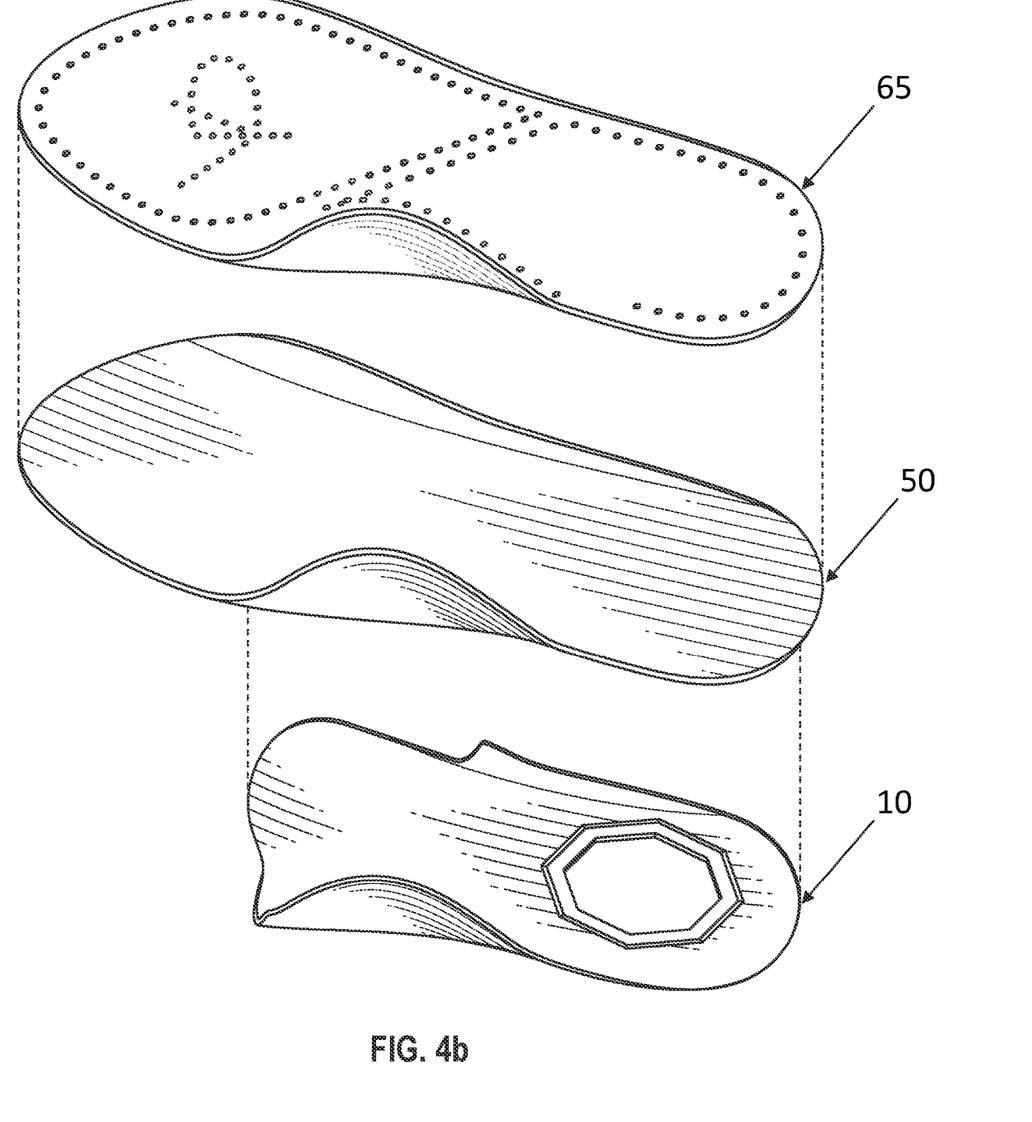

FIGS. 4a and 4b illustrate assembled (4a) and expanded (4b) views of a tri-layer insole 100 in accordance with a preferred embodiment, which includes semi-rigid shell 10, insole comfort shell cover 50 and insole cover 65.

Figure 5A:
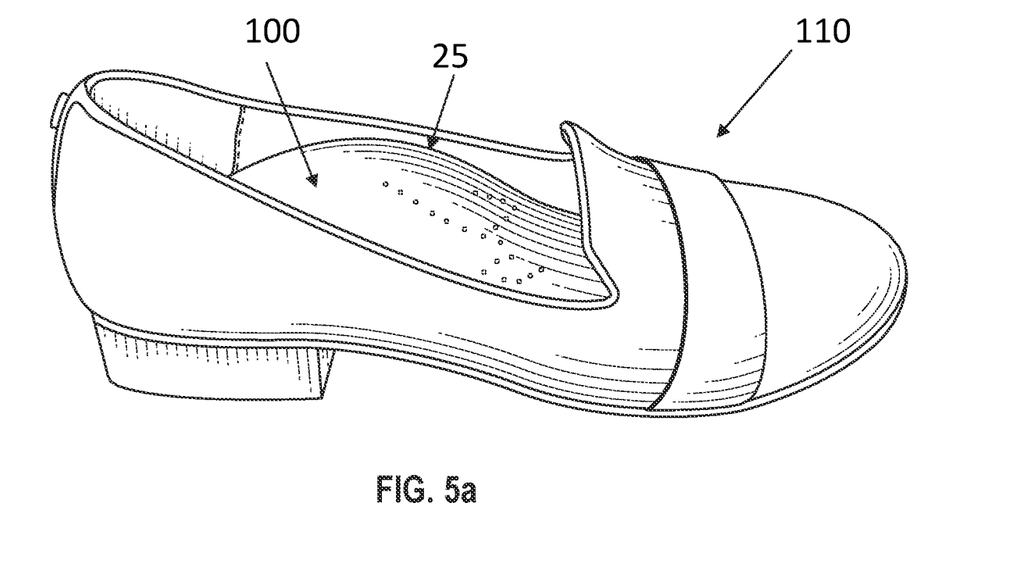
FIGS. 5a and 5b illustrate the tri-layer insole of FIGS. 4a and 4b inserted into an exemplary shoe in accordance with one or more embodiments described herein.
Figure 5B:
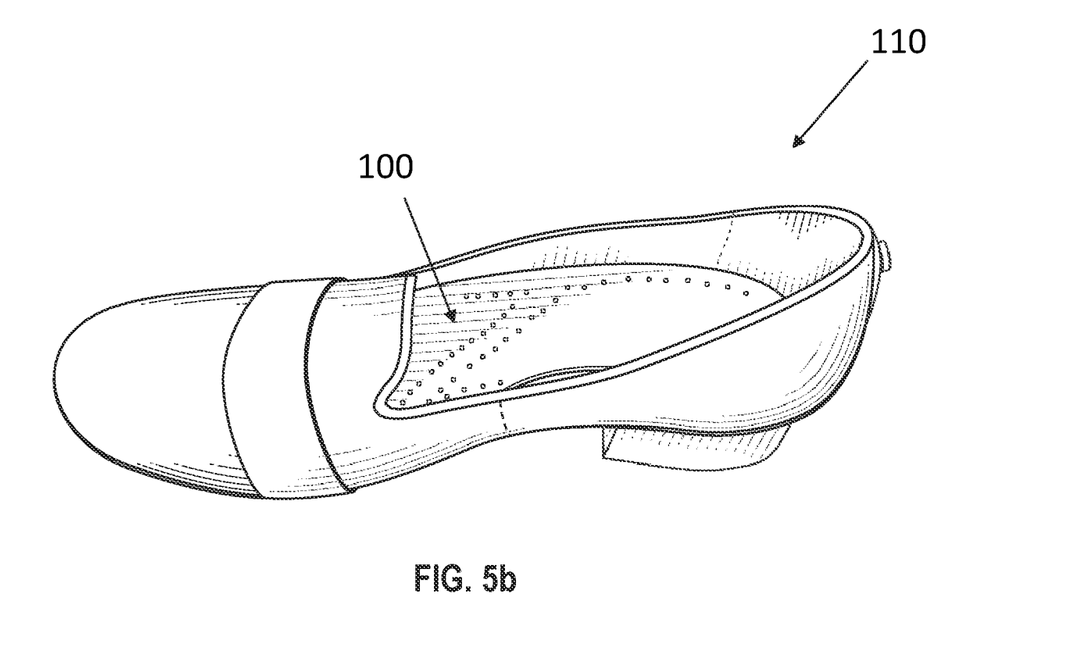

Finally, FIGS. 5a and 5b illustrate the tri-layer insole 100 inserted into an exemplary shoe 110. In FIG. 5a, the extended side portion 25 can be viewed rising up the side of the shoe, whereas in FIG. 5b, the non-extended side rests lower in the shoe. The complete insole 100 functions to allow a minimum but necessary amount of pronation and supination movement.

One skilled in the relevant art recognizes that certain characteristics described herein are merely exemplary. As such, variations and additions thereto, which are known to those skilled in the relevant art are believed to be within the scope of the invention.

The invention claimed is:

1. A semi-rigid shell for a shoe insole, comprising:
   a unitary composition of semi-rigid material having a length that is less than a total length of the shoe insole;
   wherein the unitary composition includes a first extended side that extends at least 30 mm up an inner side of a wearer's foot at a highest point in a direction perpendicular to the shoe insole at a first edge and slopes down on either side of the highest point, said first extended side is opposite of a second non-extended edge; and
   further wherein, along a second edge of the second non-extended side opposite the first edge on an outside of a wearer's foot, the unitary composition includes a notch that extends into the width of the second non-extended edge by at least approximately 10 mm.

2. The semi-rigid shell of claim 1, wherein the semi-rigid material is thermoplastic polyurethane.

3. The semi-rigid shell of claim 1, wherein the length of the semi-rigid shell is approximately 60 to 65% of the total length of the shoe sole.

4. The semi-rigid shell of claim 1, further including a hole therethrough at a first end thereof, the hole being approximately 35 mm wide at a largest width.

5. The semi-rigid shell of claim 1, wherein a width of the semi-rigid shell at a heel of the wearer's foot is approximately 50 mm.

6. The semi-rigid shell of claim 1, wherein the notch runs a length of the second non-extended edge by an amount that is at least 40 mm.

7. A tri-layer shoe insole comprising:
   a first layer formed of a semi-rigid material and having a first length and first width that are less than a tri-layer shoe sole length and width, wherein the first layer includes a first extended side that extends at least 30 mm up the inner side of a wearer's foot at a highest point in a direction perpendicular to the tri-layer shoe insole at a first edge and slopes down on either side of the highest point, said first extended side is opposite of a second non-extended edge;
   the first layer further including a notch located along a second edge of the second non-extended side opposite the first edge, wherein the notch extends into a width of the second non-extended edge by at least approximately 10 mm;
   a second layer contacted to the first layer, the second layer being formed of a flexible material and having a second length and a second width that are approximately equal to the tri-layer shoe insole length and width; and
   a third layer contacted to the second layer, the third layer being formed of a wicking material and having a third length and a third width that are approximately equal to the shoe insole length and width.

8. The tri-layer shoe insole of claim 7, wherein the first length is approximately parallel to the tri-layer shoe insole is greater than 50% of a length of the tri-layer shoe insole and less than 75% of a length of the shoe insole and having a width approximately parallel to the tri-layer shoe insole that is greater than 75% of a width of the shoe insole and less than 100% of a width of the tri-layer shoe insole.

9. The tri-layer shoe insole of claim 7, wherein the semi-rigid material is thermoplastic polyurethane.

10. The tri-layer shoe insole of claim 8, wherein the length of the semi-rigid shell is approximately 60 to 65% of the total length of the tri-layer shoe sole.

11. The tri-layer shoe insole of claim 7, wherein the first layer further includes a hole therethrough at a first end thereof, the hole being approximately 35 mm wide at a largest width.

12. The tri-layer shoe insole of claim 7, wherein the notch runs a length of the second non-extended edge by an amount that is at least 40 mm.

13. A shoe support insole, comprising:
   a semi-rigid shell of unitary composition of semi-rigid material; and a shell cover, wherein the shell cover is approximately equal in length and width to a length and width of a shoe's insole and the semi-rigid shell's dimensions are less than the length of the shell cover and less than the width of the shell cover;

wherein the unitary composition includes a first extended side that extends at least 30 mm up the inner side of a wearer's foot at a highest point in a direction perpendicular to the shoe insole at a first edge and slopes down on either side of the highest point, said first extended side is opposite of a second non-extended edge; and further wherein, along a second edge of the second non-extended side opposite the first edge, the unitary composition includes a notch that extends into the width of the second non-extended edge by at least approximately 10 mm.

14. The shoe support insole of claim 13, wherein a length of the semi-rigid shell is approximately parallel to the shell cover is greater than 50% of a length of the shell cover and less than 75% of a length of the shell cover and a width of the semi-rigid shell is approximately parallel to the shell cover and is greater than 75% of a width of the shell cover and less than 100% of a width of the shell cover.

15. The shoe support insole of claim 14, wherein the length of the semi-rigid shell is approximately 60 to 65% of the length of the shell cover.

16. The shoe support insole of claim 13, wherein the semi-rigid material is thermoplastic polyurethane.

17. The shoe support insole of claim 13, wherein the semi-rigid shell further includes a hole therethrough at a first end thereof at a heel location of the wearer's foot, the hole being approximately 35 mm wide at a largest width and the shell cover includes a heel pad, said heel pad protruding through the hole in the semi-rigid shell.

18. The shoe support insole of claim 13, wherein the notch runs a length of the second non-extended edge by an amount that is at least 40 mm.

19. The shoe support insole of claim 17, wherein the shell cover includes a support pad at a metatarsal location of the wearer's foot.

20. The shoe support insole of claim 19, wherein the heel pad and the support pad are formed of a material selected from the group consisting of a thermoplastic elastomer and a thermoplastic rubber.

* * * * *